G. F. GREENWOOD.
METHOD OF AND APPARATUS FOR EXTRACTING SUGAR FROM CANE, &c.
APPLICATION FILED DEC. 4, 1917.
1,299,458.
Patented Apr. 8, 1919.
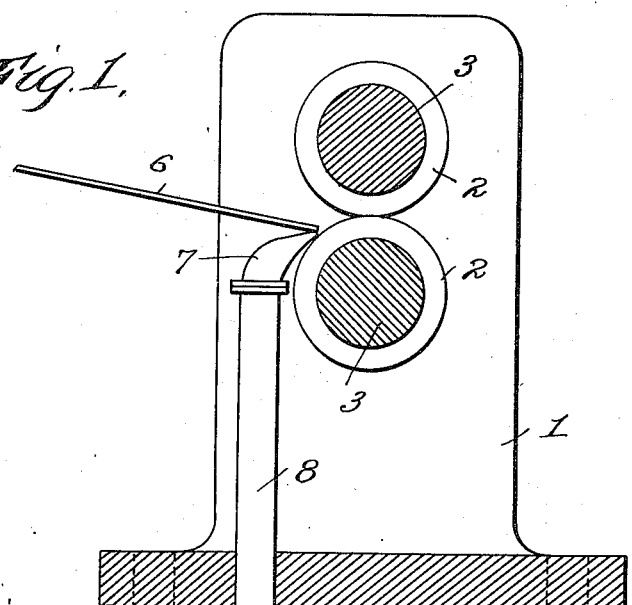
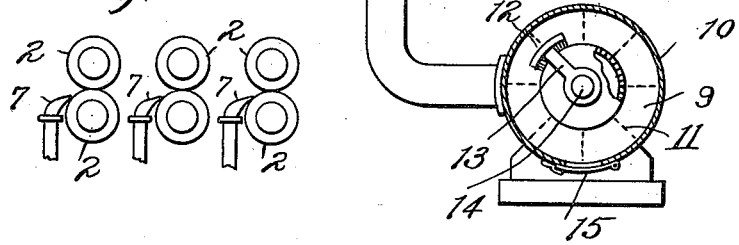
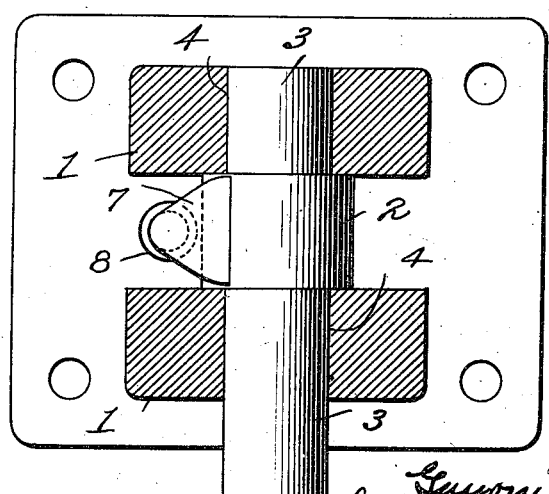

UNITED STATES PATENT OFFICE.

GUYON F. GREENWOOD, OF GEORGEVILLE, QUEBEC, CANADA.

METHOD OF AND APPARATUS FOR EXTRACTING SUGAR FROM CANE, &c.

1,299,458.      Specification of Letters Patent.      Patented Apr. 8, 1919.

Application filed December 4, 1917. Serial No. 205,345.

*To all whom it may concern:*

Be it known that I, GUYON F. GREENWOOD, a citizen of the Dominion of Canada, residing at Georgeville, in the Province of Quebec, Canada, have invented new and useful Improvements in Methods of and Apparatus for Extracting Sugar from Cane, &c., of which the following is a full and clear specification.

I shall describe my invention by way of illustration as used in recovering sugar from cane, but the invention is not to be understood as limited to that use.

In usual methods of recovering sugar from cane the cane is passed through crushing rolls, usually three in number, and the sugar bearing juice is pressed out by the rolls and falls by gravity. The ordinary mills have rolls driven at a speed of from 2.5 to 4 revolutions per minute, the rolls being massive and of large diameter, giving the relatively slow surface speed to the bagasse of about 30 feet per minute, this slow speed appearing to be necessary in order to get an effective extraction of juice with this simple crushing and gravity method. In order to secure large output from such mills, the rolls are customarily made of considerable length, from 60 to 84 inches about, and in order to get a proper crushing effect with such long rolls, heavy pressure must be applied, resulting in great strain and wear on the bearings. But even so such rolls are subject to considerable deflection, so that the cane near the journals is subjected to more effective crushing than that at the center of the rolls. Furthermore, differences of density of the material passing through cause different degrees of compression, and the fluid driven out of one denser part is taken up by the crushed and somewhat porous less dense parts and goes into the bagasse. The ordinary cane contains about 16% of sugar, 9% of cellulose, and 75% of water, and by the imperfect method of extraction in common use which I have described above an average of perhaps 65% of the sugar is extracted with about two-thirds of the water—the remaining sugar and water going off with the bagasse. When the bagasse is used as fuel the sugar in the bagasse supplies about enough heat to evaporate the moisture—leaving, roughly considered, the cellulose alone as the fuel. An increase of the sugar extraction will increase the profit of operation therefore, without impairing the fuel value of the bagasse, if the increased sugar extraction is accompanied by a corresponding increase in water extraction.

My invention has for its object such corresponding increase of the sugar and water extraction, and a speeding up of the whole operation, and has as its principal departure the rapid and substantially complete removal of the sugar bearing liquid as it is crushed out of the cane. With such a method of operation, not only is there the direct result of greatly increasing the completeness of the extraction because the liquid is taken directly away instead of being reabsorbed by or allowed to remain unpressed from the bagasse, but the operation is so rapid that the rolls can be driven at much higher speed—resulting in a surface speed for the bagasse of say 300 feet per minute, and the rolls can profitably be driven direct by turbine and electric motor. Shorter rolls may also be profitably employed and thereby a better and more positive crushing effect can be obtained (again increasing the percentage of extraction) and yet the total pressures kept within limits which will allow the use of roller bearings for the rolls.

The accompanying drawings illustrate merely the general outlines of a form of apparatus adapted to carry out my invention, but it is given by way of illustration only, as many modifications can be made therein without departing from the invention.

Figure 1 shows such apparatus in side elevation.

Fig. 2 is a top view of a single roll and adjacent parts.

Fig. 3 is a diagrammatic representation of a plurality of pairs of crushing rolls provided with suction nozzles.

1 is a casing of any suitable form supporting crushing rolls 2 of any customary or desired number and arrangement. Preferably, as illustrated by the single roll shown in Fig. 2, the rolls are comparatively short and have their heavy shafts 3 mounted in roller bearings 4 and are driven by motor not shown which may be economically driven from direct connected turbine generator.

The feed board is shown at 6 to which the cane is supplied in any usual or preferred manner. Means are provided for drawing liquid direct from the cane at the moment of crushing. Without intending to limit myself thereto, I have shown as a convenient arrangement, a suction nozzle or nozzles 7, preferably of a width equal to the length of the roll as shown in Fig. 2 and opening as shown in Fig. 1, close to the surface of the lower roll or rolls. Its receiving end should lie so close to the stream of cane as to subject the fluid at the moment of crushing, to the suction of the nozzle—so that air contained in and drawn through the stream of fiber, will carry with it into the nozzle all of the fluid at the moment it is set free by the action of the crushing rolls. Any desired means of supplying suction to the nozzle or nozzles may be used. I have shown a trunk 8 led from the latter and communicating with a chamber 9 containing a perforated axial drum 10 connected at its one end to a rapidly driven suction fan or other air exhausting device indicated by dotted lines at 11, capable of maintaining the required vacuum in the nozzles. I consider about fifteen pounds a proper vacuum. A brush 12 may be mounted by arm 13 from shaft 14 rotated by any suitable power, to sweep the surface of drum 10 and keep it clear of fiber and other particles caught by the surface of the drum and separated out of the stream of sugar liquid. A door 15 is provided for cleaning chamber 9. The sugar liquid is discharged from the fan to usual receiving and storage vessels.

By reason of the advantages already described, it is considered that an increased yield of sugar of approximately 50% may be obtained by this improvement and that more expeditiously and economically and with little, if any, decrease in fuel value of the bagasse.

I claim:

1. The method of obtaining juice from sugar cane and the like, consisting in expressing it and withdrawing it immediately on its expression to prevent its re-absorption by the cane.

2. Apparatus for carrying out the method of claim 1, comprising in combination, means for expressing the juice and means for immediately withdrawing the juice to prevent its re-absorption by the cane.

3. Apparatus such as set forth in claim 2, having in combination rolls for expressing the juice from the cane and means for removing the juice thereby expressed, comprising suction means having its inlet presented in juxtaposition to the surface of one of the rolls immediately below the passing cane.

GUYON F. GREENWOOD.

Witnesses:
WM. E. KNIGHT,
RAY T. ERNST.